US012748646B2

(12) United States Patent
Sethi et al.

(10) Patent No.: US 12,748,646 B2
(45) Date of Patent: Sep. 29, 2026

(54) SELF-LEARNING FRAMEWORK FOR OPTIMAL RECOVERY OPERATIONS

(71) Applicant: Dell Products L.P., Round Rock, TX (US)

(72) Inventors: Parminder Singh Sethi, Punjab (IN); Anay Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 18/482,503

(22) Filed: Oct. 6, 2023

(65) Prior Publication Data

US 2025/0117000 A1 Apr. 10, 2025

(51) Int. Cl.
*G06F 11/00* (2006.01)
*G06F 11/07* (2006.01)
*G06F 21/55* (2013.01)

(52) U.S. Cl.
CPC ...... *G06F 11/0751* (2013.01); *G06F 11/0766* (2013.01); *G06F 21/55* (2013.01)

(58) Field of Classification Search
CPC ........................................................ G06F 21/55
See application file for complete search history.

(56) References Cited

U.S. PATENT DOCUMENTS 12,341,797 B1 * 6/2025 Adamson ............ H04L 63/1425
2006/0242286 A1 * 10/2006 Hawkins ............ G06F 11/0709 714/E11.173
2016/0048408 A1 * 2/2016 Madhu .................. H04L 47/783 718/1
2019/0297079 A1 * 9/2019 Delcourt ............... G06F 21/554
2020/0241953 A1 * 7/2020 Ali ....................... G06F 11/0787
2020/0375353 A1 * 12/2020 Matlin ................... F16M 11/10
2021/0216509 A1 * 7/2021 Jayanthi .............. G06F 16/1734
2024/0248790 A1 * 7/2024 Verma ................. G06F 11/0712

OTHER PUBLICATIONS

Wikipedia, "Latent Dirichlet allocation" (Year: 2022).*

(Continued)

*Primary Examiner* — Bryce P Bonzo
*Assistant Examiner* — Gabriella Kanani Shelton
(74) *Attorney, Agent, or Firm* — Chamberlain, Hrdlicka, White, Williams & Aughtry; Aly Z. Dossa

(57) ABSTRACT

A method for optimal service recovery. The method includes: receiving, by a vendor recovery service, a production inventory file reflecting a current configuration of a client production environment of a client infrastructure; processing, by the vendor recovery service and using at least one learning model, a corpus of production inventory files including the production inventory file to obtain a production recovery file; transmitting, by the vendor recovery service, the production recovery file to the client infrastructure; receiving, by a client recovery service of the client infrastructure, the production recovery file for the client production environment; making a determination, by the client recovery service and based on a monitoring of the client production environment, that the client production environment is experiencing a failure; and performing, by the client recovery service and based on the determination, an optimized recovery of the client production environment according to the production recovery file.

20 Claims, 11 Drawing Sheets

(56) References Cited

OTHER PUBLICATIONS

Unimrkt Research, "The Importance of Data Cleaning" (Year: 2023).*
Guo, Manping et al. "Normal Workflow and Key Strategies for Data Cleaning Toward Real-World Data: Viewpoint." Interactive journal of medical research vol. 12 e44310. Sep. 21, 2023, doi:10.2196/44310 (Year: 2023).*
Benardokasi, "Data Cleaning: Steps to Clean Data," GeoPoll (Year: 2021).*

* cited by examiner

SELF-LEARNING FRAMEWORK FOR OPTIMAL RECOVERY OPERATIONS

BACKGROUND

To keep businesses up and running, it is imperative that there is an active fallback and contingency mechanism in place. In the event of some major failure or disruption of services in a datacenter, due to a natural calamity or vandalism or attack, the systems should have a defined set of automated guidelines that could be followed so that the impact of this disruption is minimal on the business.

SUMMARY

In general, in one aspect, embodiments described herein relate to a method for optimal service recovery. The method includes: receiving, by a vendor recovery service and from a client infrastructure, a production inventory file reflecting a current configuration of a client production environment of the client infrastructure; processing, by the vendor recovery service and using at least one learning model, a corpus of production inventory files including the production inventory file to obtain a production recovery file reflecting an optimal service recovery strategy; transmitting, by the vendor recovery service, the production recovery file to the client infrastructure; receiving, by a client recovery service of the client infrastructure, the production recovery file for the client production environment; making a determination, by the client recovery service and based on a monitoring of the client production environment, that the client production environment is experiencing a failure; and performing, by the client recovery service and based on the determination, an optimized recovery of the client production environment according to the optimal service recovery strategy reflected in the production recovery file.

In general, in one aspect, embodiments described herein relate to a non-transitory computer readable medium (CRM). The non-transitory CRM including computer readable program code, which when executed by a computer processor, enables the computer processor to perform a method for optimal service recovery. The method includes: receiving, by a vendor recovery service and from a client infrastructure, a production inventory file reflecting a current configuration of a client production environment of the client infrastructure; processing, by the vendor recovery service and using at least one learning model, a corpus of production inventory files including the production inventory file to obtain a production recovery file reflecting an optimal service recovery strategy; transmitting, by the vendor recovery service, the production recovery file to the client infrastructure; receiving, by a client recovery service of the client infrastructure, the production recovery file for the client production environment; making a determination, by the client recovery service and based on a monitoring of the client production environment, that the client production environment is experiencing a failure; and performing, by the client recovery service and based on the determination, an optimized recovery of the client production environment according to the optimal service recovery strategy reflected in the production recovery file.

In general, in one aspect, embodiments described herein relate to a system. The system includes: a client infrastructure including a client production environment and a client recovery service; and a vendor infrastructure operatively connected to the client infrastructure, and including a vendor recovery service, wherein the vendor recovery service includes a first computer processor configured to at least in part perform a method for optimal service recovery. The method includes: receiving, from the client infrastructure, a production inventory file reflecting a current configuration of the client production environment of the client infrastructure; processing, using at least one learning model, a corpus of production inventory files including the production inventory file to obtain a production recovery file reflecting an optimal service recovery strategy; and transmitting the production recovery file to the client infrastructure, wherein the client recovery service includes a second computer processor configured to at least in part perform the method for optimal service recovery. The method further includes: receiving the production recovery file for the client production environment; making a determination, based on a monitoring of the client production environment, that the client production environment is experiencing a failure; and performing, based on the determination, an optimized recovery of the client production environment according to the optimal service recovery strategy reflected in the production recovery file.

Other aspects of embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
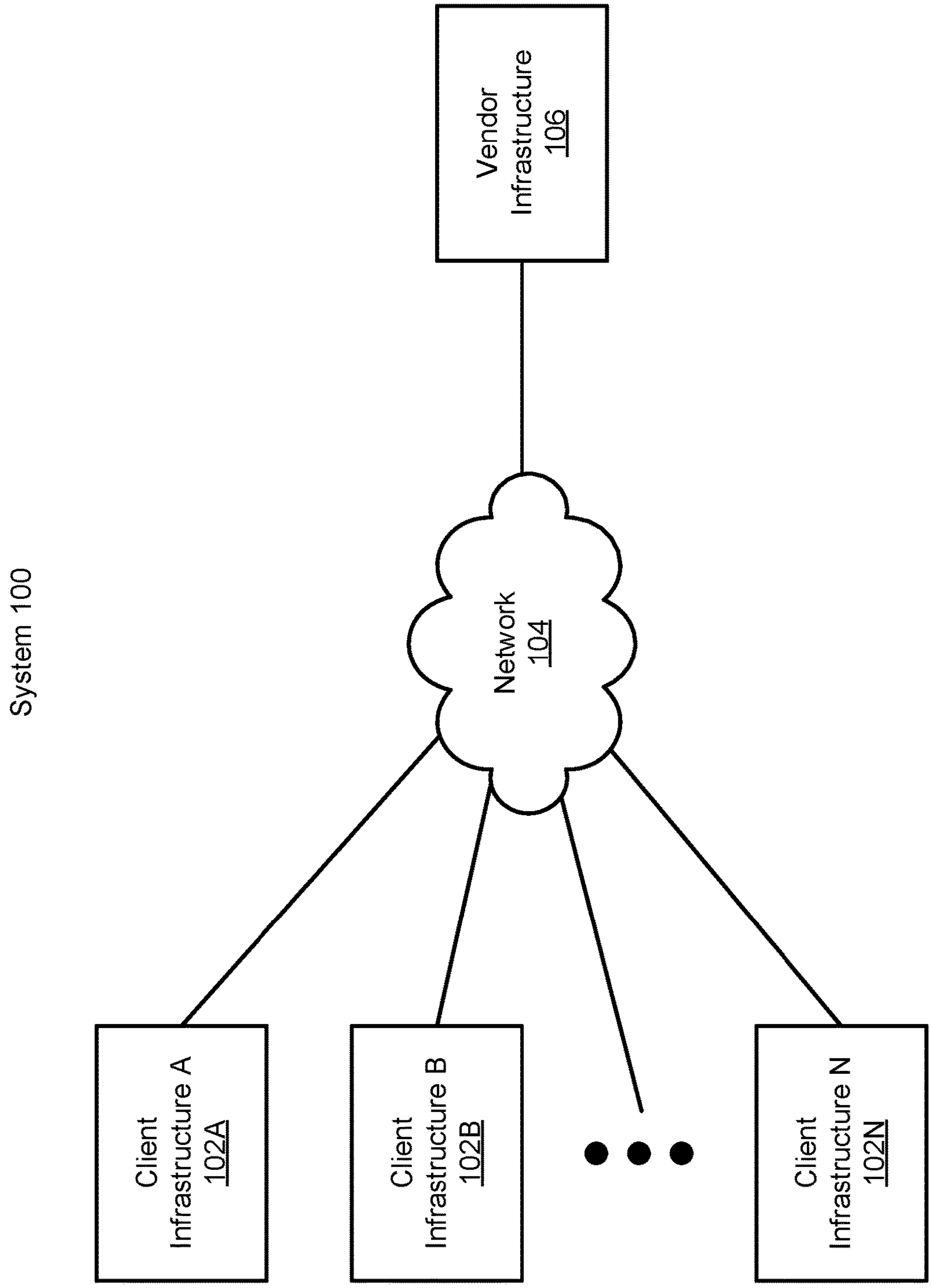
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to a self-learning framework for optimal recovery operations. Particularly, to keep businesses up and running, it is imperative that there is an active fallback and contingency mechanism in place. In the event of some major failure or disruption of services in a datacenter, due to a natural calamity or vandalism/attack, the systems should have a defined set of automated guidelines that could be followed so that the impact of this disruption is minimal on the business. However, the process of a datacenter recovery is often a time taking process, which creates impact on the business. Often there is lack of proper planning and optimal approach.

Embodiments described herein propose one such unique methodology, which takes care of datacenter disaster recovery planning and will be highly advantageous during the re-configuration of datacenters. Said methodology entails, (i) prior to the failure of any datacenter-collecting configuration and/or state information reflective thereof; generating a production inventory file based on the collected information; transmitting the generated production inventory file to a datacenter vendor counterpart; and receiving a production recovery file from said datacenter vendor counterpart, which is generated, at least in part, based on the transmitted production inventory file, and (ii) following the failure of any datacenter—identifying at least a portion of any service(s) on the datacenter, which may have been impacted by the failure; instructing a backup datacenter of the datacenter to activate any fallback service(s) thereon corresponding to the identified at least portion of service(s); perform an optimized recovery of said at least portion of service(s) on the datacenter according to the received production recovery file; and instructing the backup datacenter to deactivate any activated fallback service(s) thereon once the corresponding at least portion of service(s) has/have been recovered. Further, said optimized recovery may employ one or more machine learning model(s) and/or techniques, including: Latent Dirichlet Allocation (LDA), structural diversity analysis, single label analysis, multi-label model comparison, and label correlation analysis.

FIG. 1A shows a system in accordance with one or more embodiments described herein. The system (100) may include one or more client infrastructures (102A-102N) and a vendor infrastructure (106). Each of these system (100) components is described below.

In one or many embodiment(s) described herein, any client infrastructure (102A-102N) may represent a privately owned and maintained enterprise information technology (IT) environment belonging to an enterprise IT customer or client. Any enterprise IT customer/client, in turn, may refer to an organization or entity whom may procure, or otherwise obtain and employ, any number of enterprise IT products and/or services. Any client infrastructure (102A-102N), furthermore, may be implemented through on-premises infrastructure, cloud computing infrastructure, or any hybrid infrastructure thereof. Additionally, or alternatively, any client infrastructure (102A-102N) may be implemented using one or more computing systems similar to the exemplary computing system illustrated and described with respect to FIG. 6, below. Any client infrastructure (102A-102N), moreover, is illustrated and described in further detail below with respect to FIG. 1B.

In one or many embodiment(s) described herein, the vendor infrastructure (106) may represent a privately owned and maintained enterprise IT environment belonging to an enterprise IT vendor. An enterprise IT vendor, in turn, may refer to an organization or entity whom may provide, or otherwise offer and update, any number of enterprise IT products and/or services. The vendor infrastructure (106), furthermore, may be implemented through on-premises infrastructure, cloud computing infrastructure, or any hybrid infrastructure thereof. Additionally, or alternatively, the vendor infrastructure (106) may be implemented using one or more computing systems similar to the exemplary computing system illustrated and described with respect to FIG. 6, below. The vendor infrastructure (106), moreover, is illustrated and described in further detail below with respect to FIG. 1D.

In one or many embodiment(s) described herein, the above-mentioned system (100) components (or subcomponents thereof) may communicate with one another through a network (104) (e.g., a local area network (LAN), a wide area network (WAN) such as the Internet, a mobile network, any other network type, or any combination thereof). The network (104) may be implemented using any combination of wired and/or wireless connections. Further, the network (104) may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
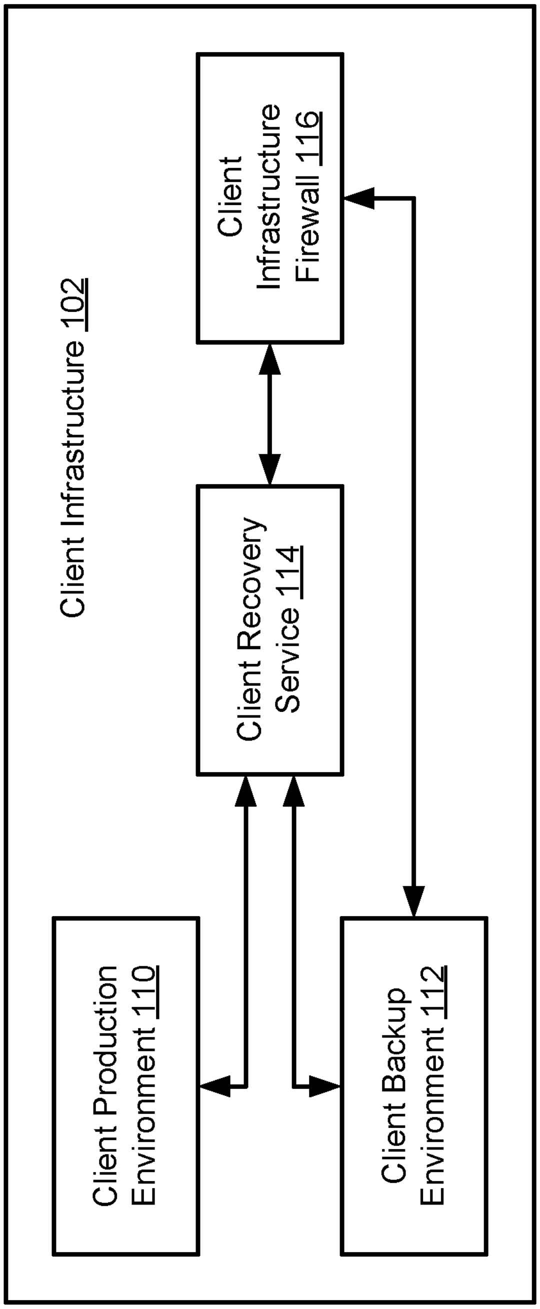
FIG. 1B shows a client infrastructure in accordance with one or more embodiments described herein.

FIG. 1B shows a client infrastructure in accordance with one or more embodiments described herein. The client infrastructure (102) may include a client production environment (110), a client backup environment (112), a client recovery service (114), and a client infrastructure firewall (116). Each of these client infrastructure (102) components is described below.

In one or many embodiment(s) described herein, the client production environment (110) may refer to a primary datacenter responsible for providing an execution environment in which any number of services (described below), pertinent to day-to-day operations of an enterprise IT customer/client (see e.g., FIG. 1A), may execute. In providing said execution environment, the client production environment (110) may include and allocate various resources (e.g., computer processors, memory, storage, virtualization, network bandwidth, etc.), as needed, to the service(s) and/or any tasks (or processes) instantiated thereby. Further, said various resources may be spread across, and thus the client production environment (110) may be implemented using, one or more network servers (not shown)—each of which may encompass a physical network server or a virtual network server. Additionally, or alternatively, said various resources may be spread across, and thus the client production environment (110) may be implemented using, one or more computing systems similar to the exemplary computing system illustrated and described with respect to FIG. 6, below.

In one or many embodiment(s) described herein, any service may refer to a resource at least configured to support and/or manage any number of workloads (e.g., applications). Examples of any service may include, but are not limited to, a virtual machine, a container, a database, and a collection of micro-services.

In one or many embodiment(s) described herein, and in contrast to the client backup environment (112) (described below), the client production environment (110) may remain predominantly active, and therefore, may seldom experience inactivity. Inactivity of the client production environment (110) may be caused by various reasons, including, but not limited to, scheduled maintenance, unexpected power outages, and failover (e.g., due to hardware failures, data corruption, and/or software anomalies introduced through cyber security attacks or threats).

In one or many embodiment(s) described herein, the client backup environment (112) may refer to a secondary datacenter responsible for serving as a disaster recovery alternative for the client production environment (110). In serving as said disaster recovery alternative, the client backup environment (112) may provide a similar execution environment (to that provided by the client production environment (110)) in which any service(s) executing on the client production environment (110) may also execute on the client backup environment (112) (where said service(s) on the client backup environment (112) may also be referred to herein as fallback service(s)). In providing said similar execution environment, the client backup environment (112) may include and allocate various resources (e.g., computer processors, memory, storage, virtualization, network bandwidth, etc.) (at least similar to those included on the client production environment (110)), as needed, to the fallback service(s) and/or any tasks (or processes) instantiated thereby. Further, said various resources may be spread across, and thus the client backup environment (112) may be implemented using, one or more network servers (not shown)—each of which may encompass a physical network server or a virtual network server. Additionally, or alternatively, said various resources may be spread across, and thus the client backup environment (112) may be implemented using, one or more computing systems similar to the exemplary computing system illustrated and described with respect to FIG. 6, below.

In one or many embodiment(s) described herein, and unlike the client production environment (110), the client backup environment (112) may remain predominantly inactive. The client backup environment (112) may, however, activate for periods of time to assume the responsibilities (or at least a portion thereof) of the client production environment (110) when the latter experiences intentional and unintentional inactivity.

In one or many embodiment(s) described herein, the client recovery service (114) may refer to at least one appliance—each physical or virtual-collectively configured to perform the methods illustrated and described below with respect to FIGS. 2A-3. Said at least one appliance may be implemented using one or more network servers (not shown). Additionally, or alternatively, said at least one appliance may be implemented using one or more computing systems similar to the exemplary computing system illustrated and described with respect to FIG. 6, below. The client recovery service (114), moreover, is illustrated and described in further detail below with respect to FIG. 1C.

In one or many embodiment(s) described herein, the client infrastructure firewall (116) may refer to at least one appliance—each physical or virtual-collectively configured to implement client infrastructure (102) network security. Implementation of said network security may, for example, require inspection and/or processing of at least any incoming network traffic directed to the client infrastructure (102). Further, said at least one appliance may be implemented using one or more network servers (not shown). Additionally, or alternatively, said at least one appliance may be implemented using one or more computing systems similar to the exemplary computing system illustrated and described with respect to FIG. 6, below.

In one or many embodiment(s) described herein, and at least in part, the client infrastructure firewall (116) may include functionality to: inspect and filter any incoming network traffic directed to the client infrastructure (102) (or any component(s) thereof); and based on the inspecting/filtering of any incoming network traffic-(i) permit any legitimate communications to pass onto the client recovery service (114) and/or the client backup environment (112), or (ii) isolate and/or discard any illegitimate communications. One of ordinary skill, however, will appreciate that the client infrastructure firewall (116) may perform other functionalities without departing from the scope of the embodiments described herein.

In one or many embodiment(s) described herein, the above-mentioned client infrastructure (102) components may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned client infrastructure (102) components. Moreover, in communicating with one another, the above-mentioned client infrastructure (102) components may employ any combination of wired and/or wireless communication protocols.

While FIG. 1B shows a configuration of components and/or subcomponents, other client infrastructure (102) configurations may be used without departing from the scope of the embodiments described herein.

Figure 1C:
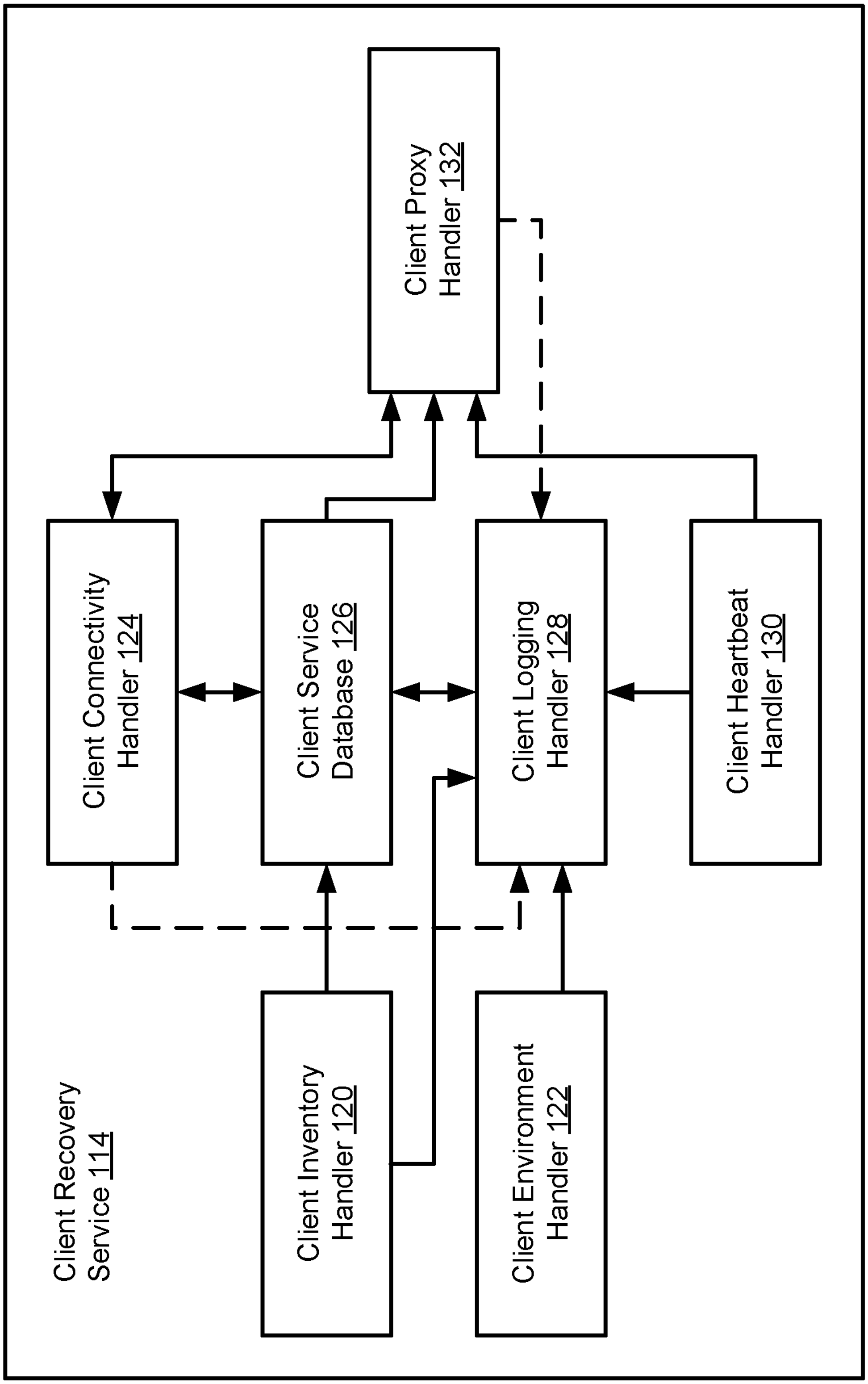
FIG. 1C shows a client recovery service in accordance with one or more embodiments described herein.

FIG. 1C shows a client recovery service in accordance with one or more embodiments described herein. The client recovery service (114) may include a client inventory handler (120), a client environment handler (122), a client connectivity handler (124), a client service database (126), a client logging handler (128), a client heartbeat handler (130), and a client proxy handler (132). Each of these client recovery service (114) components is described below.

In one or many embodiment(s) described herein, the client inventory handler (120) may refer to instruction-processing hardware (e.g., any number of integrated circuits for processing computer readable instructions), a computer program executing on the underlying hardware of the client recovery service (114), or any combination thereof, at least configured to collect inventory data (exemplified below) reflective of any current configuration and/or state of the client production environment (see e.g., FIG. 1B) and produce production inventory files based on the collected inventory data. One of ordinary skill, however, will appreciate that the client inventory handler (120) may perform other functionalities without departing from the scope of the embodiments described herein.

In one or many embodiment(s) described herein, any collected inventory data may, for example, pertain to any hardware, software, virtualization, connectivity, storage, and/or networking configurations and/or state presently reflected in/by the client production environment. Example component(s) of one or more of said configurations and/or examples of said state(s) may include, but are not limited to: any physical infrastructure (e.g., network servers, storage servers, network consoles, network switches, network routers, network hubs, etc.); any installed logical infrastructure (e.g., operating system(s), application(s), service(s), utility/utilities, etc.); device interconnectivity data and protocols; and virtual machine snapshots.

In one or many embodiment(s) described herein, the client environment handler (122) may refer to instruction-processing hardware (e.g., any number of integrated circuits for processing computer readable instructions), a computer program executing on the underlying hardware of the client recovery service (114), or any combination thereof, at least configured to monitor the client production environment (see e.g., FIG. 1B) and detect any failures (e.g., partial or complete) being experienced by the client production environment. The client environment handler (122) may include further functionality to detect any recovered service(s) impacted by any failure(s). One of ordinary skill, however, will appreciate that the client environment handler (122) may perform other functionalities without departing from the scope of the embodiments described herein.

In one or many embodiment(s) described herein, the client connectivity handler (124) may refer to instruction-processing hardware (e.g., any number of integrated circuits for processing computer readable instructions), a computer program executing on the underlying hardware of the client recovery service (114), or any combination thereof, at least configured to transmit production inventory files (described below) to, and receive production recovery files (described below) from, the vendor infrastructure (see e.g., FIGS. 1A and 1D). One of ordinary skill, however, will appreciate that the client connectivity handler (124) may perform other functionalities without departing from the scope of the embodiments described herein.

In one or many embodiment(s) described herein, any production inventory file may refer to a document reflective of any current configuration and/or state of the client production environment. Examples of said current configuration and/or state pertaining to the client production environment may include, but are not limited to, any physical infrastructure (e.g., network servers, storage servers, network consoles, network switches, network routers, network hubs, etc.); any installed logical infrastructure (e.g., operating system(s), application(s), service(s), utility/utilities, etc.); device interconnectivity data and protocols; and virtual machine snapshots.

In one or many embodiment(s) described herein, any production recovery file may refer to a document reflective of an optimal service recovery strategy, or a plan through which any failed service(s) is/are optimally recovered. To that end, any production recovery file may include or specify: a prioritization sequence outlining an order through which any failed service(s) ought to be recovered, which may, at least in part, be contingent on any interdependency/interdependencies (exemplified below) between said failed service(s); and a priority weightage assigned to each recovery action thread, where any recovery action thread may refer to a process segment of a process configured to recovery at least a portion of any failed service.

Examples optimal service recoveries based on any service interdependencies (and/or a lack thereof) may include, but are not limited to: a recovery of a database server configuration, which is not dependent on (and thus may be recovered in parallel with) any virtualization setup configuration; a recovery of a domain name system (DNS) or an active directory is dependent on (and thus must be recovered in series following) a recovery of a networking configuration (e.g., network switches, virtual local area networks (VLANs), dynamic host configuration protocol (DHCP), etc.) first; and a recovery of any monitoring services (e.g., simple network management protocol (SNMP), etc.) is not dependent on (and thus may be recovered in parallel with) any email services (e.g., simple mail transfer protocol (SMTP), etc.).

In one or many embodiment(s) described herein, the client service database (126) may refer to instruction-processing hardware (e.g., any number of integrated circuits for processing computer readable instructions), a computer program executing on the underlying hardware of the client recovery service (114), or any combination thereof, at least configured to store various information (e.g., a production inventory file, reverse proxy rules, a production recovery file, log data, etc.) pertinent to client recovery service (114) operations. One of ordinary skill, however, will appreciate that the client service database (126) may perform other functionalities without departing from the scope of the embodiments described herein.

In one or many embodiment(s) described herein, the client logging handler (128) may refer to instruction-processing hardware (e.g., any number of integrated circuits for processing computer readable instructions), a computer program executing on the underlying hardware of the client recovery service (114), or any combination thereof, at least configured to record log data concerning client recovery service (114) events. One of ordinary skill, however, will appreciate that the client logging handler (128) may perform other functionalities without departing from the scope of the embodiments described herein.

Figure 1D:
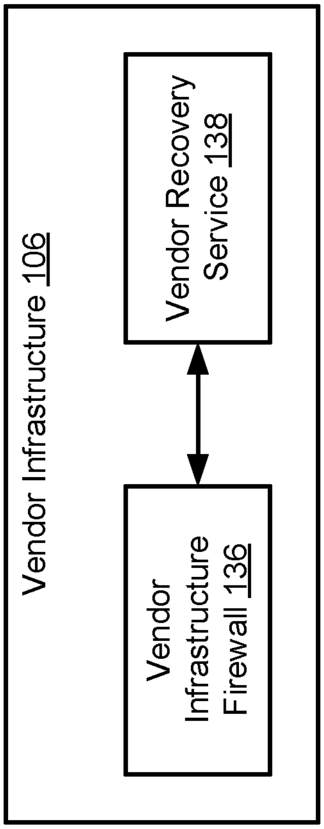
FIG. 1D shows a vendor infrastructure in accordance with one or more embodiments described herein.

In one or many embodiment(s) described herein, the client heartbeat handler (130) may refer to instruction-processing hardware (e.g., any number of integrated circuits for processing computer readable instructions), a computer program executing on the underlying hardware of the client recovery service (114), or any combination thereof, at least configured to advertise a status of the client recovery service (114) through transmission of periodic heartbeat messages addressed to the vendor infrastructure (see e.g., FIGS. 1A and 1D). One of ordinary skill, however, will appreciate that the client heartbeat handler (130) may perform other functionalities without departing from the scope of the embodiments described herein.

In one or many embodiment(s) described herein, the client proxy handler (132) may refer to instruction-processing hardware (e.g., any number of integrated circuits for processing computer readable instructions), a computer program executing on the underlying hardware of the client recovery service (114), or any combination thereof, at least configured to implement a reverse proxy in order to supplement the network security functionality of the client infrastructure firewall (see e.g., FIG. 1B). Any reverse proxy may refer to a physical appliance, a computer program, or any combination thereof, at least configured to function as a secondary firewall. One of ordinary skill, however, will appreciate that the client proxy handler (132) may perform other functionalities without departing from the scope of the embodiments described herein.

While FIG. 1C shows a configuration of components and/or subcomponents, other client recovery service (114) configurations may be used without departing from the scope of the embodiments described herein.

FIG. 1D shows a vendor infrastructure in accordance with one or more embodiments described herein. The vendor infrastructure (106) may include a vendor infrastructure firewall (136) and a vendor recovery service (138). Each of these vendor infrastructure (106) components is described below.

In one or many embodiment(s) described herein, the vendor infrastructure firewall (136) may refer to at least one appliance—each physical or virtual-collectively configured to implement vendor infrastructure (106) network security. Implementation of said network security may, for example, require inspection and/or processing of at least any incoming network traffic directed to the vendor infrastructure (106). Further, said at least one appliance may be implemented using one or more network servers (not shown). Additionally, or alternatively, said at least one appliance may be implemented using one or more computing systems similar to the exemplary computing system illustrated and described with respect to FIG. 6, below.

In one or many embodiment(s) described herein, and at least in part, the vendor infrastructure firewall (136) may include functionality to: inspect and filter any incoming network traffic directed to the vendor infrastructure (106) (or any component(s) thereof. One of ordinary skill, however, will appreciate that the vendor infrastructure firewall (136) may perform other functionalities without departing from the scope of the embodiments described herein.

In one or many embodiment(s) described herein, the vendor recovery service (138) may refer to at least one appliance—each physical or virtual-collectively configured to perform the methods illustrated and described below with respect to FIGS. 4 and 5. Said at least one appliance may be implemented using one or more network servers (not shown). Additionally, or alternatively, said at least one appliance may be implemented using one or more computing systems similar to the exemplary computing system illustrated and described with respect to FIG. 6, below. The vendor recovery service (138), moreover, is illustrated and described in further detail below with respect to FIG. 1E.

In one or many embodiment(s) described herein, the above-mentioned vendor infrastructure (106) components may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned vendor infrastructure (106) components. Moreover, in communicating with one another, the above-mentioned vendor infrastructure (106) components may employ any combination of wired and/or wireless communication protocols.

While FIG. 1D shows a configuration of components and/or subcomponents, other vendor infrastructure (106) configurations may be used without departing from the scope of the embodiments described herein.

Figure 1E:
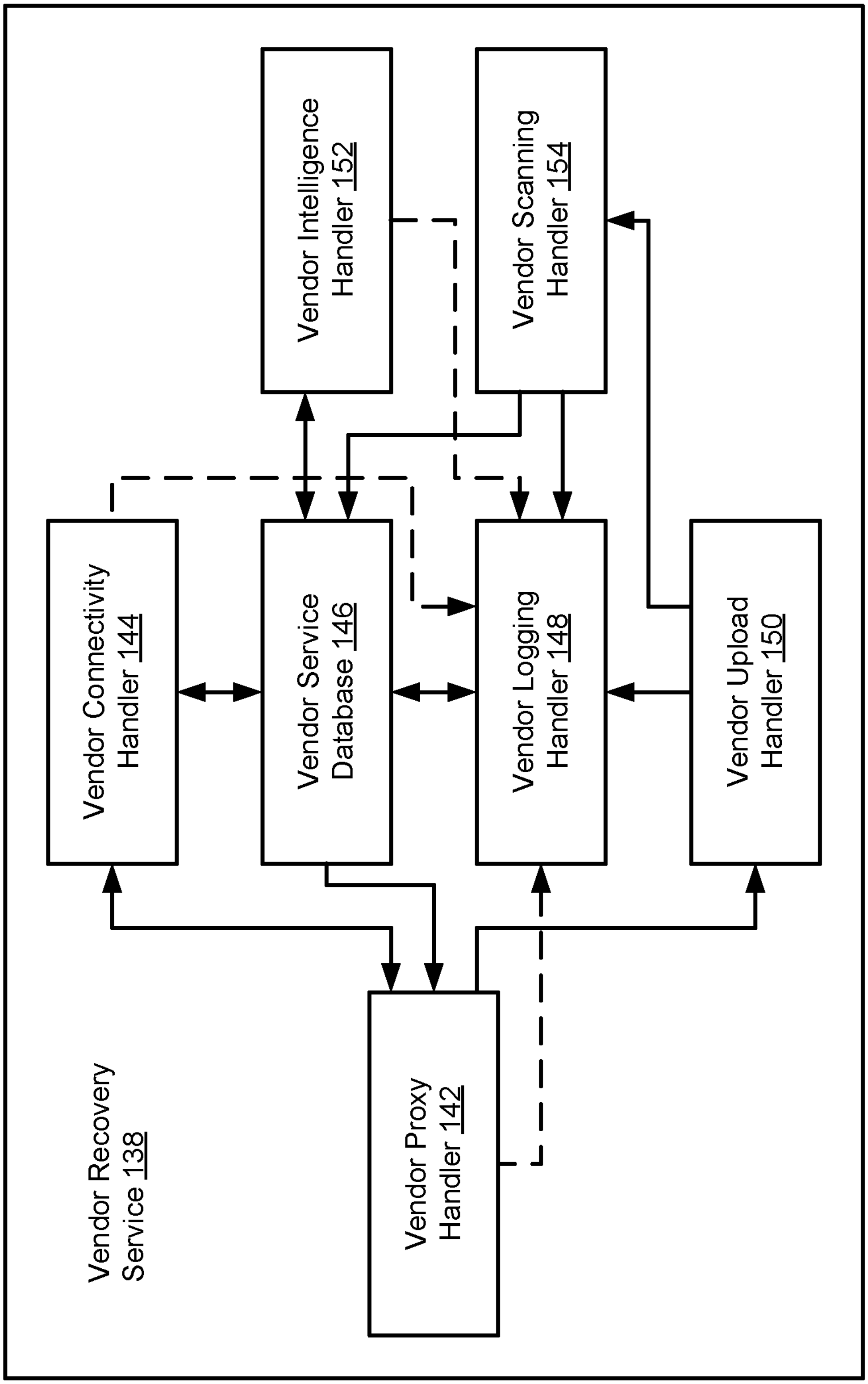
FIG. 1E shows a vendor recovery service in accordance with one or more embodiments described herein.

FIG. 1E shows a vendor recovery service in accordance with one or more embodiments described herein. The vendor recovery service (138) may include a vendor proxy handler (142), a vendor connectivity handler (144), a vendor service database (146), a vendor logging handler (148), a vendor upload handler (150), a vendor intelligence handler (152), and a vendor scanning handler (154). Each of these vendor recovery service (138) components is described below.

In one or many embodiment(s) described herein, the vendor proxy handler (142) may refer to instruction-processing hardware (e.g., any number of integrated circuits for processing computer readable instructions), a computer program executing on the underlying hardware of the vendor recovery service (138), or any combination thereof, at least configured to implement a reverse proxy (i.e., a secondary firewall) in order to supplement the network security functionality of the vendor infrastructure firewall (see e.g., FIG. 1D). One of ordinary skill, however, will appreciate that the vendor proxy handler (142) may perform other functionalities without departing from the scope of the embodiments described herein.

In one or many embodiment(s) described herein, the vendor connectivity handler (144) may refer to instruction-processing hardware (e.g., any number of integrated circuits for processing computer readable instructions), a computer program executing on the underlying hardware of the vendor recovery service (138), or any combination thereof, at least configured to track heartbeat messages from any number of client infrastructures (see e.g., FIG. 1A) and instruct the client backup environment (see e.g., FIG. 1B) of any client infrastructure to activate one or more fallback services should an expected heartbeat message from the client infrastructure fail to arrive. One of ordinary skill, however, will appreciate that the vendor connectivity handler (144) may perform other functionalities without departing from the scope of the embodiments described herein.

In one or many embodiment(s) described herein, the vendor service database (146) may refer to instruction-processing hardware (e.g., any number of integrated circuits for processing computer readable instructions), a computer program executing on the underlying hardware of the vendor recovery service (138), or any combination thereof, at least configured to store various information (e.g., corpus of production inventory files received from any number of client infrastructures, corpus of production recovery files, reverse proxy rules, log data, etc.) pertinent to vendor recovery service (138) operations. One of ordinary skill, however, will appreciate that the vendor service database (146) may perform other functionalities without departing from the scope of the embodiments described herein.

In one or many embodiment(s) described herein, the vendor logging handler (148) may refer to instruction-processing hardware (e.g., any number of integrated circuits for processing computer readable instructions), a computer program executing on the underlying hardware of the vendor recovery service (138), or any combination thereof, at least configured to record log data concerning vendor recovery service (138) events. One of ordinary skill, however, will appreciate that the vendor logging handler (148) may perform other functionalities without departing from the scope of the embodiments described herein.

In one or many embodiment(s) described herein, the vendor upload handler (150) may refer to instruction-processing hardware (e.g., any number of integrated circuits for processing computer readable instructions), a computer program executing on the underlying hardware of the vendor recovery service (138), or any combination thereof, at least configured to receive any number of production inventory files from any number of client infrastructures. One of ordinary skill, however, will appreciate that the vendor upload handler (150) may perform other functionalities without departing from the scope of the embodiments described herein.

In one or many embodiment(s) described herein, the vendor intelligence handler (152) may refer to instruction-processing hardware (e.g., any number of integrated circuits for processing computer readable instructions), a computer program executing on the underlying hardware of the vendor recovery service (138), or any combination thereof, at least configured to implement a self-learning framework for optimal recovery operations. One of ordinary skill, however, will appreciate that the vendor intelligence handler (152) may perform other functionalities without departing from the scope of the embodiments described herein.

In one or many embodiment(s) described herein, the vendor scanning handler (154) may refer to instruction-processing hardware (e.g., any number of integrated circuits for processing computer readable instructions), a computer program executing on the underlying hardware of the vendor recovery service (138), or any combination thereof, at least configured to inspect any received production inventory files for any malicious entities (e.g., anomalies, threats, etc.), and sanitize any said received production inventory files should any malicious entities be identified. One of ordinary skill, however, will appreciate that the vendor scanning handler (154) may perform other functionalities without departing from the scope of the embodiments described herein.

While FIG. 1E shows a configuration of components and/or subcomponents, other vendor recovery service (138) configurations may be used without departing from the scope of the embodiments described herein.

Figure 2A:
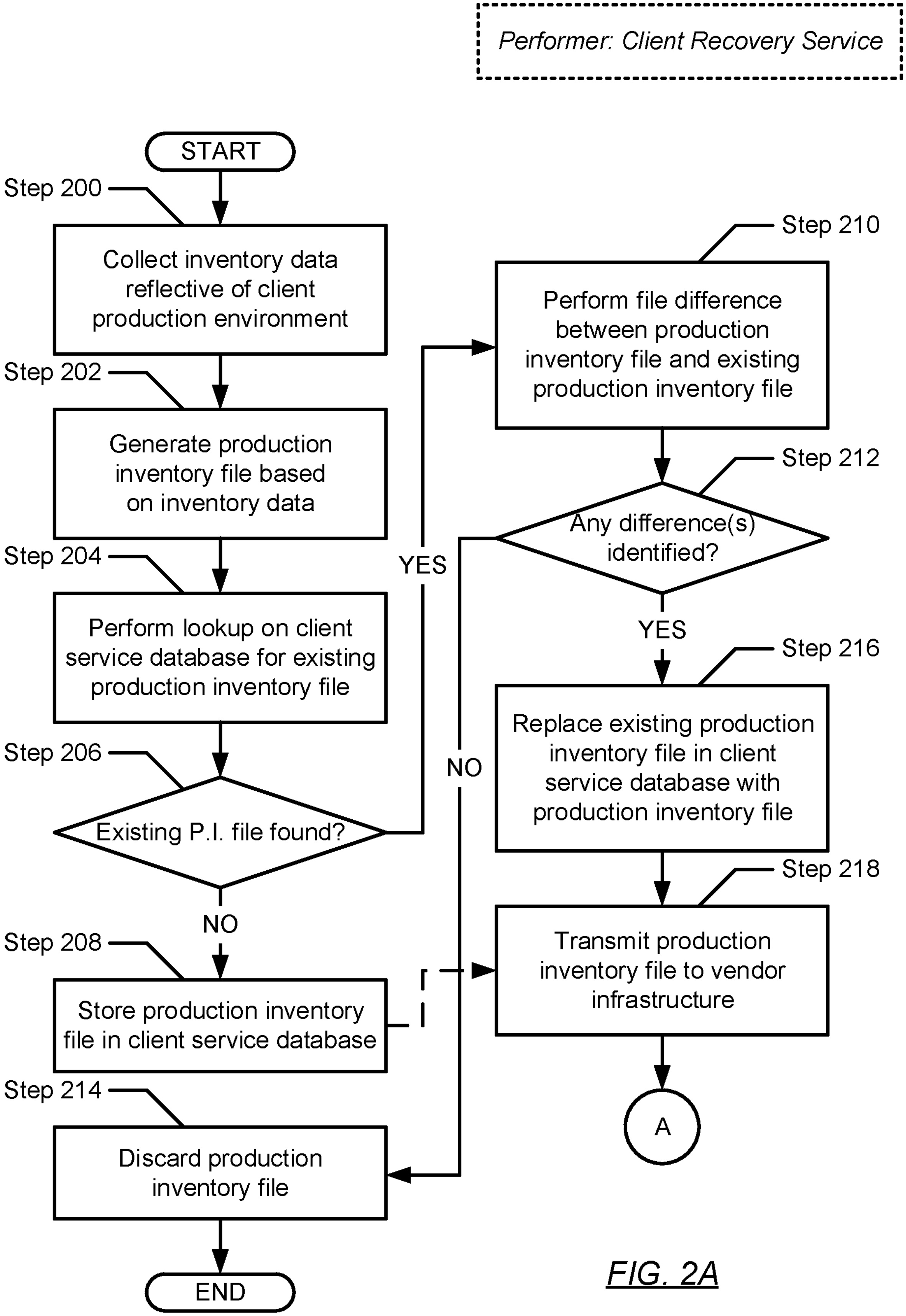
FIGS. 2A and 2B show a flowchart describing a method for receiving production recovery files in accordance with one or more embodiments described herein.
Figure 2B:
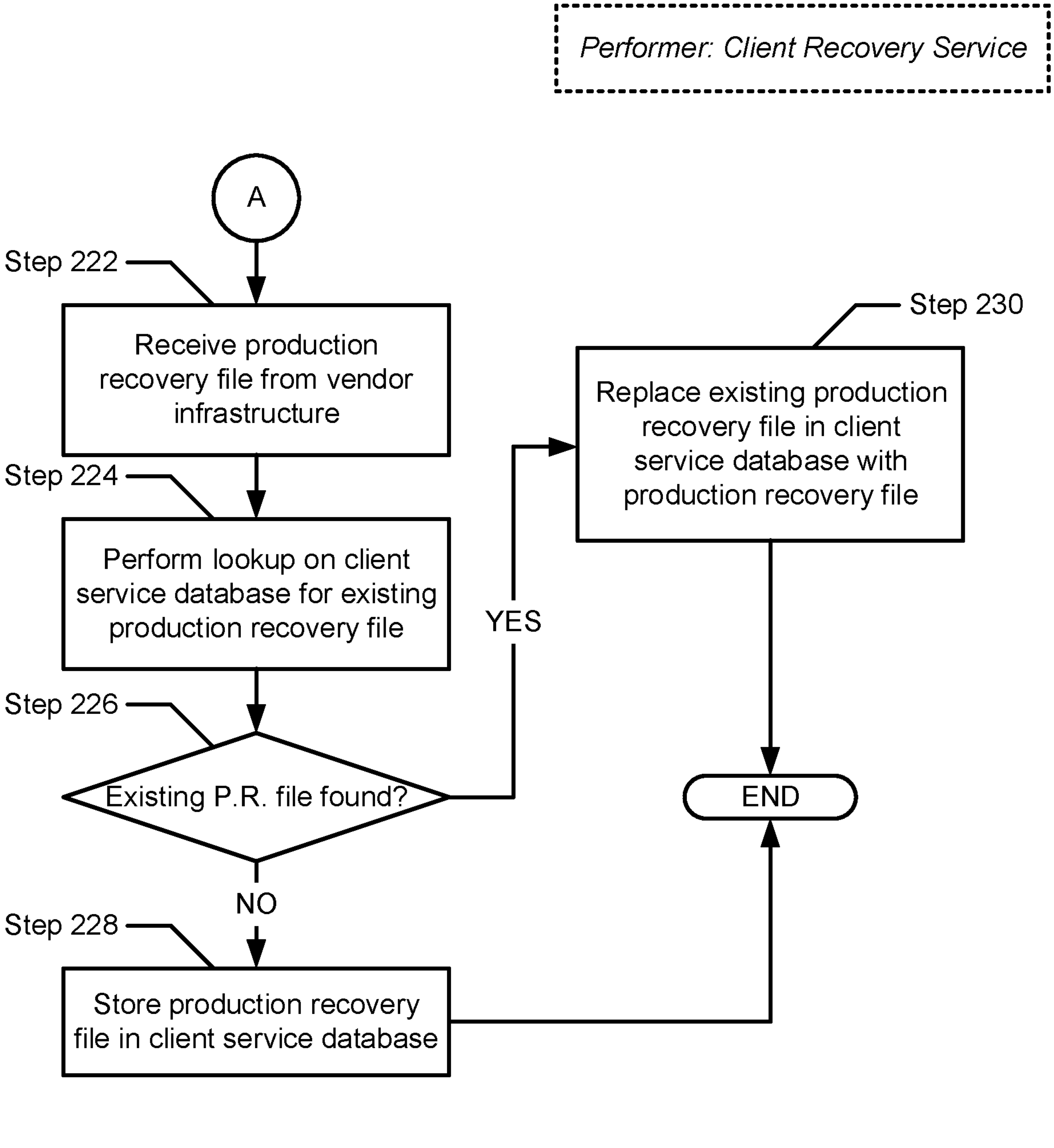

FIGS. 2A and 2B show a flowchart describing a method for receiving production recovery files in accordance with one or more embodiments described herein. The various steps outlined below may be performed by a client recovery service of any client infrastructure (see e.g., FIGS. 1A, 1B, and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, inventory data is collected. In one or many embodiment(s) described herein, the inventory data may reflect a current configuration and/or state of the client production environment (see e.g., FIG. 1B). Further, said current configuration and/or state may reflect detailed information representative, as well as descriptive, of any hardware, software, connectivity, virtualization, and/or networking resources available across the client production environment.

In Step 202, based on the inventory data (collected in Step 200), a production inventory file is generated.

In Step 204, a lookup is performed on a client service database (see e.g., FIG. 1C) in search for an existing production inventory file. In one or many embodiment(s) described herein, an existing production inventory file (if any) may refer to a previously generated production inventory file.

In Step 206, based on the lookup on the client service database (performed in Step 204), a determination is made as to whether an existing production inventory file is stored/maintained on the client service database. In one or many embodiment(s) described herein, if it is determined that an existing production inventory file has not been identified, then the method proceeds to Step 208. On the other hand, in one or many other embodiment(s) described herein, if it is alternatively determined that an existing production inventory file has been identified, then the method alternatively proceeds to Step 210.

In Step 208, following the determination (made in Step 206) that an existing production inventory file is not stored/maintained on the client service database based on the lookup applied thereto (performed in Step 204), the production inventory file (generated in Step 202) is stored in the client service database.

Hereinafter, the method proceeds to Step 218 (described below).

In Step 210, following the alternate determination (made in Step 206) that an existing production inventory file is stored/maintained on the client service database based on the lookup applied thereto (performed in Step 204), a file difference is performed between (or entailing) the existing production inventory file and the production inventory file (generated in Step 202). In one or many embodiment(s) described herein, the file difference may reference a software-defined, text-based comparison utility or technique through which one or more differences (if any) may be identified that differentiate(s) the production inventory file from the existing production inventory file (and/or vice versa).

In Step 212, based on the file difference (performed in Step 210), a determination is made as to whether any difference(s) has/have been identified between the existing production inventory file (found based on the alternate determination made in Step 206) and the production inventory file (generated in Step 202). In one or many embodiment(s) described herein, if it is determined that zero differences have been identified (i.e., the production inventory file matches the existing production inventory file), then the method proceeds to Step 214. On the other hand, in one or many other embodiment(s) described herein, if it is alternatively determined that at least one difference has been identified (i.e., the production inventory file mismatches the existing production inventory file), then the method alternatively proceeds to Step 216.

In Step 214, following the determination (made in Step 212) that zero differences have been identified between the existing production inventory file (found based on the alternate determination made in Step 206) and the production inventory file (generated in Step 202) based on the file difference (performed in Step 210), the production inventory file is discarded.

In Step 216, following the alternate determination (made in Step 212) that at least one difference has been identified between the existing production inventory file (found based on the alternate determination made in Step 206) and the production inventory file (generated in Step 202) based on the file difference (performed in Step 210), the existing production inventory file is replaced, in the client service database, with the production inventory file.

In Step 218, the production inventory file (generated in Step 202) is transmitted towards a vendor infrastructure (see e.g., FIGS. 1A and 1D).

Hereinafter, the method proceeds to Step 222 (see e.g., FIG. 2B).

Turning to FIG. 2B, in Step 222, in response to the production inventory file (transmitted thereto in Step 218), a production recovery file is received from the vendor infrastructure.

In Step 224, a lookup is performed on the client service database (see e.g., FIG. 1C) in search for an existing production recovery file. In one or many embodiment(s) described herein, an existing production recovery file (if any) may refer to a previously received production recovery file.

In Step 226, based on the lookup on the client service database (performed in Step 224), a determination is made as to whether an existing production recovery file is stored/maintained on the client service database. In one or many embodiment(s) described herein, if it is determined that an existing production recovery file has not been identified, then the method proceeds to Step 228. On the other hand, in one or many other embodiment(s) described herein, if it is alternatively determined that an existing production recovery file has been identified, then the method alternatively proceeds to Step 230.

In Step 228, following the determination (made in Step 226) that an existing production recovery file is not stored/maintained on the client service database based on the lookup applied thereto (performed in Step 224), the production recovery file (received inn step 222) is stored in the client service database.

In Step 230, following the alternate determination (made in Step 226) that an existing production recovery file is stored/maintained on the client service database based on the lookup applied thereto (performed in Step 224), the existing production recovery file is replaced, in the client service database, with the production recovery file (received in Step 222).

Figure 3:
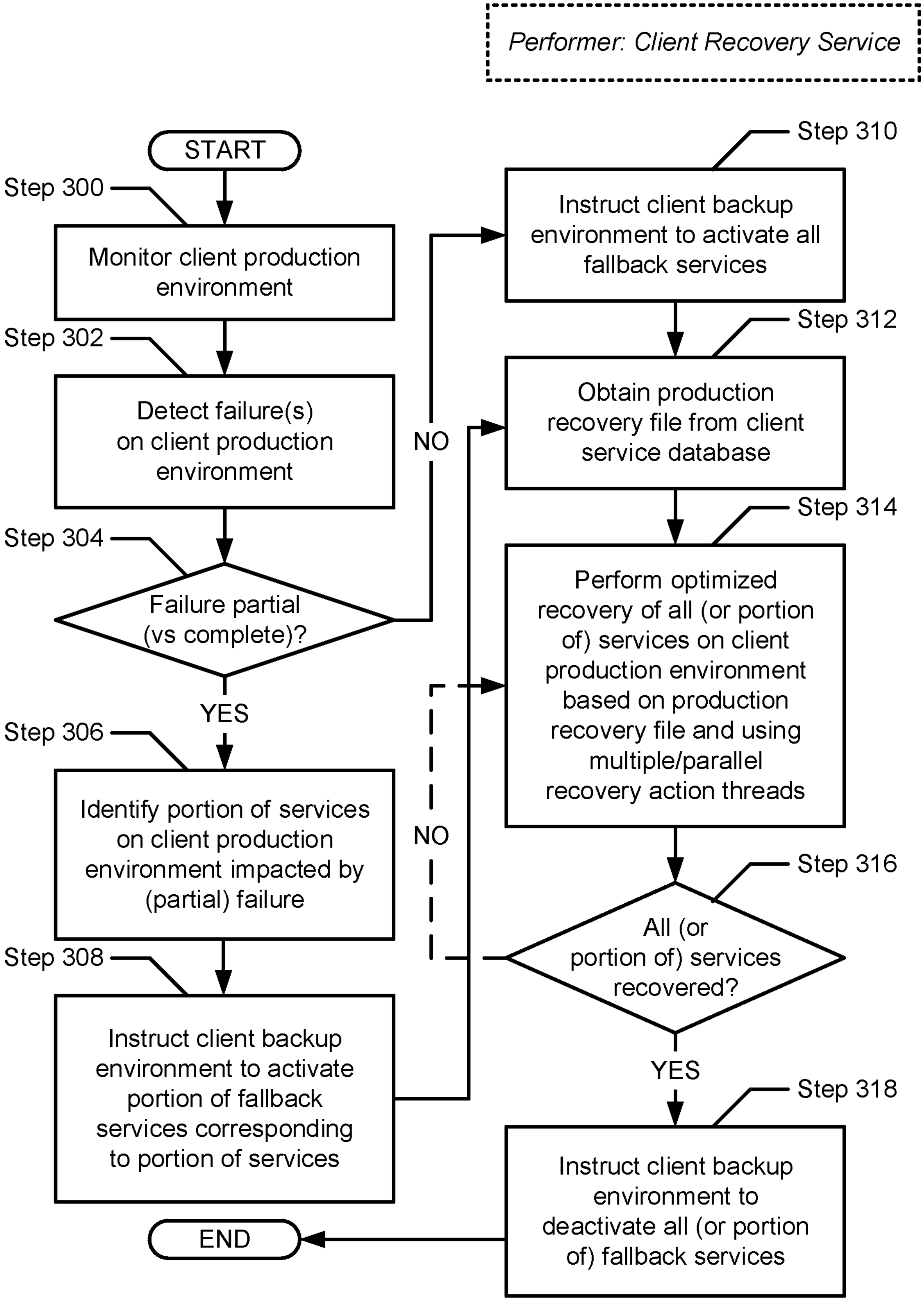
FIG. 3 shows a flowchart describing a method for triggering optimal thread-based recovery operations in accordance with one or more embodiments described herein.

FIG. 3 shows a flowchart describing a method for triggering optimal thread-based recovery operations in accordance with one or more embodiments described herein. The various steps outlined below may be performed by a client recovery service of any client infrastructure (see e.g., FIGS. 1A, 1B, and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a client production environment (see e.g., FIG. 1B) is monitored.

In Step 302, based on the monitoring (performed in Step 300), one or more failures, impacting the client production environment, is/are detected. In one or many embodiment(s) described herein, said failure(s) may inflict the client production environment in entirety or in part. Further, said failure(s) may render a portion or all of the service(s), which had been operating on the client production environment, inoperable.

In Step 304, based on the failure(s) (detected in Step 302), a determination is made as to whether the client production environment is experiencing a partial failure (rather than a complete failure). In one or many embodiment(s) described herein, if it is determined that the client production environment is undergoing a partial failure (i.e., a portion of the service(s) provided by the client production environment have become inoperable), then the method proceeds to Step 306. On the other hand, in one or many other embodiment(s) described herein, if it is alternatively determined that the client production environment is undergoing a complete failure (i.e., all service(s) provided by the client production environment have become inoperable), then the method alternatively proceeds to Step 310.

In Step 306, following the determination (made in Step 304) that the client production environment is experiencing a partial failure based on the failure(s) (detected in Step 302), a portion of the service(s), provided by the client production environment, is identified. Particularly, in one or many embodiment(s) described herein, said identified portion of the service(s) include at least one service impacted by the partial failure.

In Step 308, a client backup environment (see e.g., FIG. 1B) is instructed to activate one or more fallback services implemented thereon. In one or many embodiment(s) described herein, said activated fallback service(s) may correspond to the portion of services (identified in Step 306).

Hereinafter, the method proceeds to Step 314 (described below).

In Step 310, following the alternate determination (made in Step 304) that the client production environment is experiencing a complete failure based on the failure(s) (detected in Step 302), a client backup environment (see e.g., FIG. 1B) is instructed to activate all fallback services implemented thereon. In one or many embodiment(s) described herein, said all activated fallback services may correspond to all of the services that had been operating on the client production environment prior to the complete failure.

In Step 312, a production recovery file is obtained from a client service database (see e.g., FIG. 1C).

In Step 314, based on or in accordance with the production recovery file (obtained in Step 312), an optimized recovery, of at least a portion of the service(s) that had been operable on the client production environment, is performed. That is, in one or many embodiment(s) described herein, said optimized recovery may target/entail the portion of services (identified in Step 306) of the client production environment that had been impacted by the partial failure experienced thereby. Alternatively, in one or many other embodiment(s) described herein, said optimized recovery may target/entail all of the services of the client production environment that had been impacted by the complete failure experienced thereby.

In Step 316, based on a progress of the optimized recovery (performed in Step 314), a determination is made as to whether each and every service (i.e., of the identified portion of services impacted by the partial failure in one or many embodiment(s) described herein, or of all services impacted by the complete failure in one or many other embodiment(s)) has/have recovered. In one or many embodiment(s) described herein, if it is determined that each and every impacted service has been recovered (i.e., has once again become operable), then the method proceeds to Step 318. On the other hand, in one or many other embodiment(s) described herein, if it is alternatively determined that each and every impacted service has not recovered (i.e., at least one impacted service has yet to once again become operable), then the method proceeds to Step 314 (described above), where performance of the optimized recovery continues.

In Step 318, following the determination (made in Step 316) that each and every service (i.e., of the identified portion of services impacted by the partial failure in one or many embodiment(s) described herein, or of all services impacted by the complete failure in one or many other embodiment(s)) has recovered based on a progress of the optimized recovery (performed in Step 314), the client backup environment is instructed to deactivate at least a portion of the fallback services that had been activated thereon. That is, in one or many embodiment(s) described herein, the instructed deactivation may target/entail the portion of fallback services that had been activated as a result of the partial failure that had imposed on the client production environment earlier. Alternatively, in one or many other embodiment(s) described herein, the instructed deactivation may target/entail all fallback services that had been activated as a result of the complete failure that had imposed on the client production environment earlier.

Figure 4:
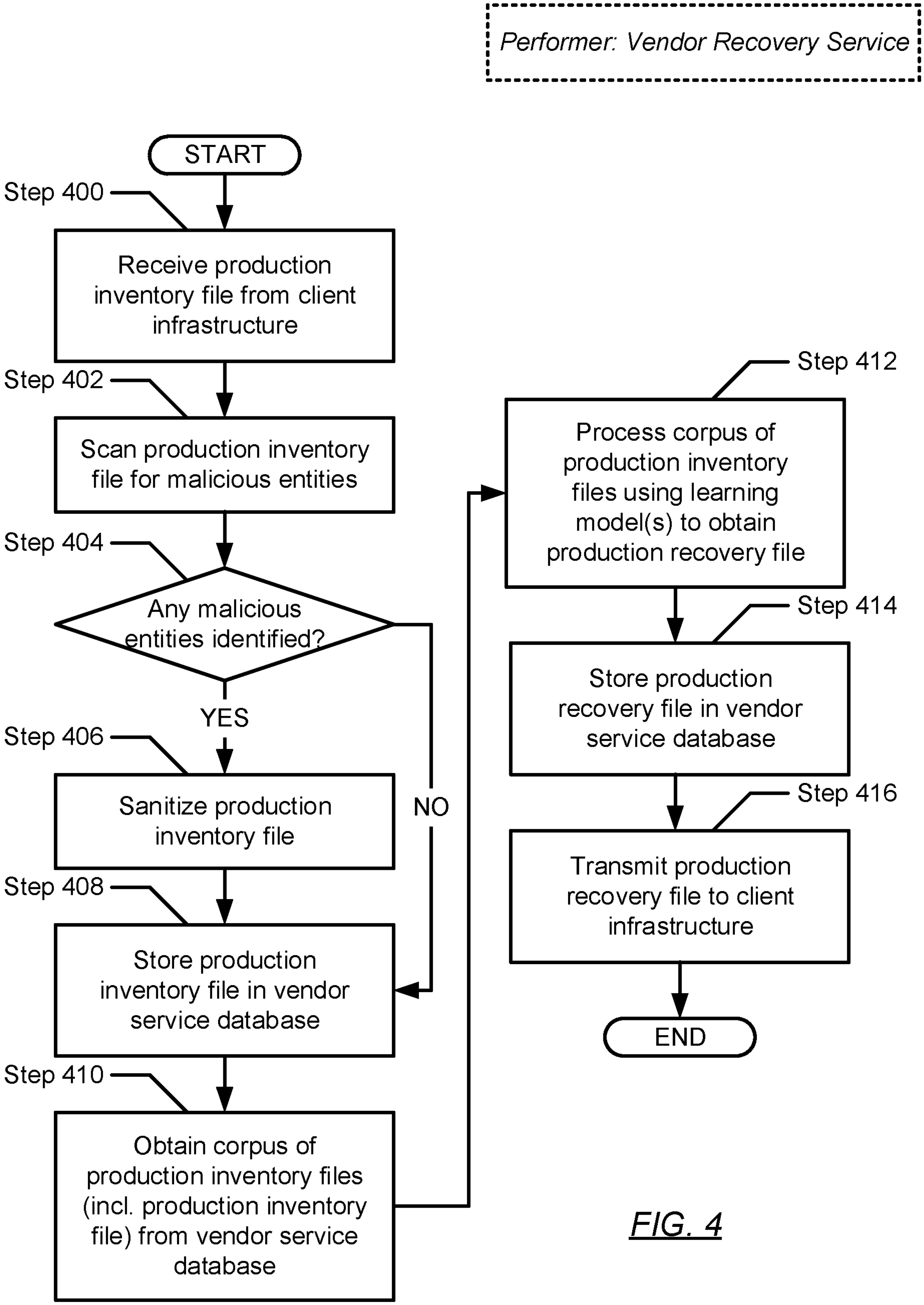
FIG. 4 shows a flowchart describing a method for handling production inventory files in accordance with one or more embodiments described herein.

FIG. 4 shows a flowchart describing a method for handling production inventory files in accordance with one or more embodiments described herein. The various steps outlined below may be performed by a vendor recovery service of the vendor infrastructure (see e.g., FIGS. 1A, 1D, and 1E). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a production inventory file is received from a client infrastructure (see e.g., FIG. 1A).

In Step 402, the production inventory file (received in Step 402) is scanned for any malicious entity/entities (e.g., anomalies, threats, etc.). In one or many embodiment(s) described herein, said malicious entity/entities may have been introduced into the production inventory file in transit from the client infrastructure to the vendor infrastructure (see e.g., FIG. 1A).

In Step 404, based on the scan (performed in Step 402), a determination is made as to whether any malicious entity/entities has/have been identified. In one or many embodiment(s) described herein, if it is determined that at least one malicious entity has been identified, then the method proceeds to Step 406. On the other hand, in one or many other embodiment(s) described herein, if it is alternatively determined that zero malicious entities have been identified, then the method alternatively proceeds to Step 408.

In Step 406, following the determination (made in Step 404) that at least one malicious entity has been identified in the production inventory file (received in Step 400) based on the scan thereof (performed in step 402), the production inventory file is sanitized (or cleansed to remove or quarantine the identified malicious entity/entities).

In Step 408, following sanitization (performed in Step 406) of the production inventory file (received in Step 400), or following the alternate determination (made in Step 404) that zero malicious entities have been identified in the production inventory file based on the scan thereof (performed in Step 402), the production inventory file is stored in a vendor service database (see e.g., FIG. 1E).

In Step 410, a corpus of production inventory files is obtained from a vendor service database (see e.g., FIG. 1E). In one or many embodiment(s) described herein, the corpus of production inventory files may include any number of production inventory files received from any number of client infrastructures. Further, the corpus of production inventory files may include the production inventory file (stored in Step 408).

In Step 412, a production recovery file, corresponding to the production inventory file (received in Step 400), is obtained. In one or many embodiment(s) described herein, attainment of the production recovery file may result from the processing of a corpus of production inventory files (obtained in Step 410) using one or more learning models. Other input(s), aside from the corpus of production inventory files, that said learning model(s) may rely on may include, but are not limited to: any interdependency/interdependencies amongst or between any installed service(s) operating on the client production environment; any possible failure(s) that could impact the client production environment; and the identification of any service(s) that may be recovered in parallel with other service(s). Furthermore, said learning model(s) may employ a combination of existing machine learning and/or artificial intelligence techniques, including: Latent Dirichlet Allocation (LDA), structural diversity analysis, single label analysis, multi-label model comparison, and label correlation analysis.

In Step 414, the production recovery file (obtained in Step 412) is subsequently stored in the vendor service database (see e.g., FIG. 1E).

In Step 416, in response to the production inventory file (received in Step 400), the production recovery file (obtained in Step 412) is transmitted towards the client infrastructure.

Figure 5:
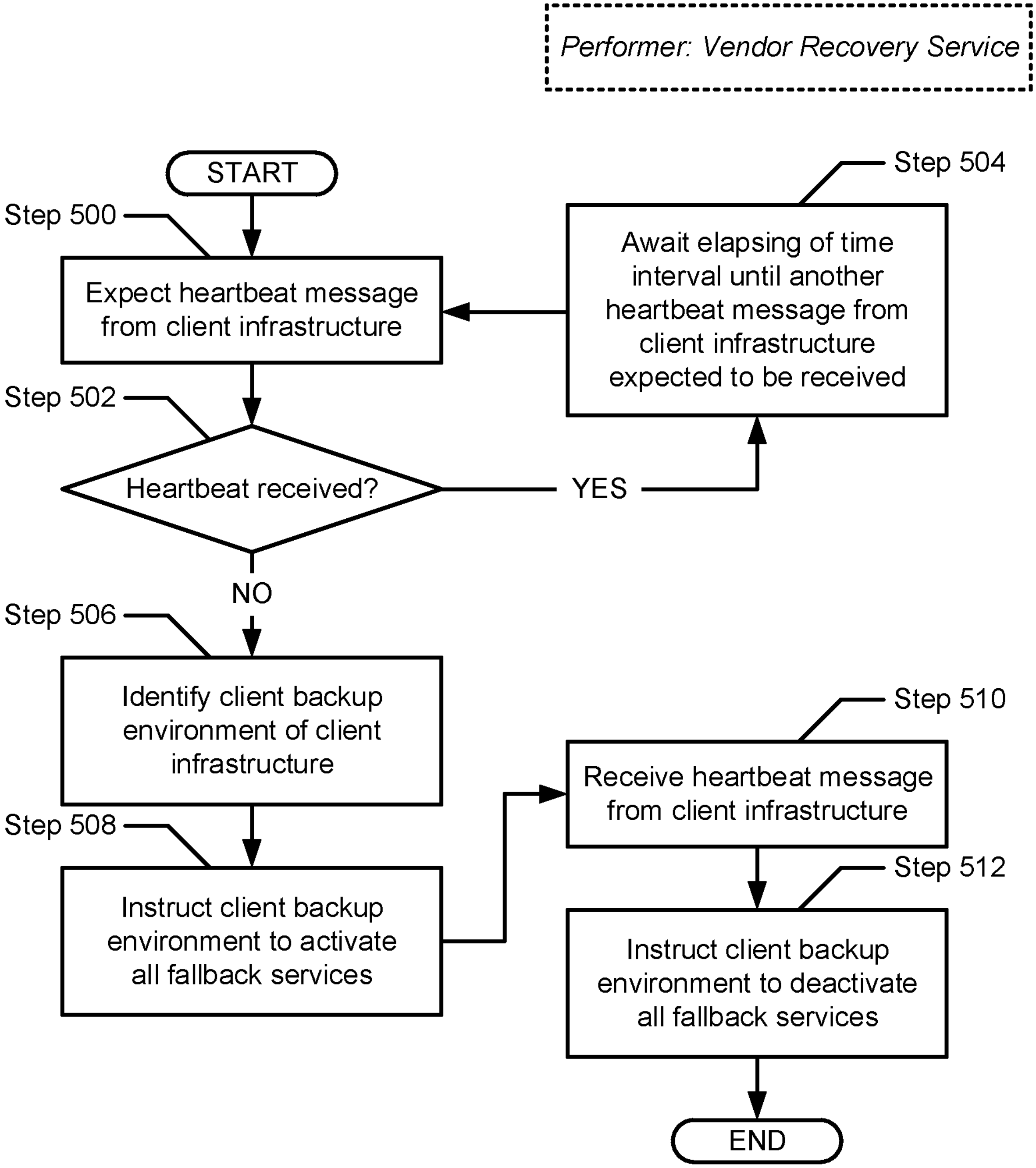
FIG. 5 shows a flowchart describing a method for performing heartbeat based actions in accordance with one or more embodiments described herein.

FIG. 5 shows a flowchart describing a method for performing heartbeat based actions in accordance with one or more embodiments described herein. The various steps outlined below may be performed by a vendor recovery service of the vendor infrastructure (see e.g., FIGS. 1A, 1D, and 1E). Further, while the various steps in the flowchart are presented and described sequentially, one of ordinary skill will appreciate that some or all steps may be executed in different orders, may be combined or omitted, and some or all steps may be executed in parallel.

Turning to FIG. 5 in Step 500, a heartbeat message, from a client infrastructure (see e.g., FIG. 1A), is expected. In one or many embodiment(s) described herein, any heartbeat message may refer to a periodically transmitted communication, from the client infrastructure to the vendor infrastructure, which advertises a current state of a client production environment of the former.

In Step 502, a determination is made as to whether any heartbeat message (expected in Step 500) has been received. In one or many embodiment(s) described herein, if it is determined that a heartbeat message has been received, then the method proceeds to Step 504. On the other hand, in one or many other embodiment(s) described herein, if it is alternatively determined that a heartbeat message has not been received, then the method alternatively proceeds to Step 506.

In Step 504, following the determination (made in Step 502) that a heartbeat message (expected in Step 500) has been received, a waiting period is experienced. Particularly, in one or many embodiment(s) described herein, the waiting period may reference a preset time interval that must transpire until another (or a next) heartbeat message from the client infrastructure is to be expected.

Hereinafter, the method proceeds to Step 500 (described above), where another (or a next) heartbeat message, from the client infrastructure, is expected.

In Step 506, following the alternate determination (made in Step 502) that a heartbeat message (expected in Step 500) has not been received, a client backup environment (see e.g., FIG. 1B) is identified. In one or many embodiment(s) described herein, said client backup environment may be associated with the client infrastructure (from which the heartbeat message had been expected).

In Step 508, the client backup environment (identified in Step 506) is instructed to activate all fallback services implemented thereon. In one or many embodiment(s) described herein, said all activated fallback services may correspond to all of the services that had been operating on the client production environment (of the client infrastructure) prior to an assumed complete failure befalling the client production environment based on not receiving the heartbeat message (expected in Step 500).

In Step 510, another heartbeat message, from the client infrastructure, is received. In one or many embodiment(s) described herein, the other heartbeat message may be received following the resolution of any networking issue(s) between the vendor recovery service and any client recovery service, or the recovery of any service(s) impacted by any failure(s) that had occurred on any client production environment.

In Step 510, the client backup environment (identified in Step 506) is instructed to deactivate all fallback services that had been activated (in Step 608) thereon.

Figure 6:
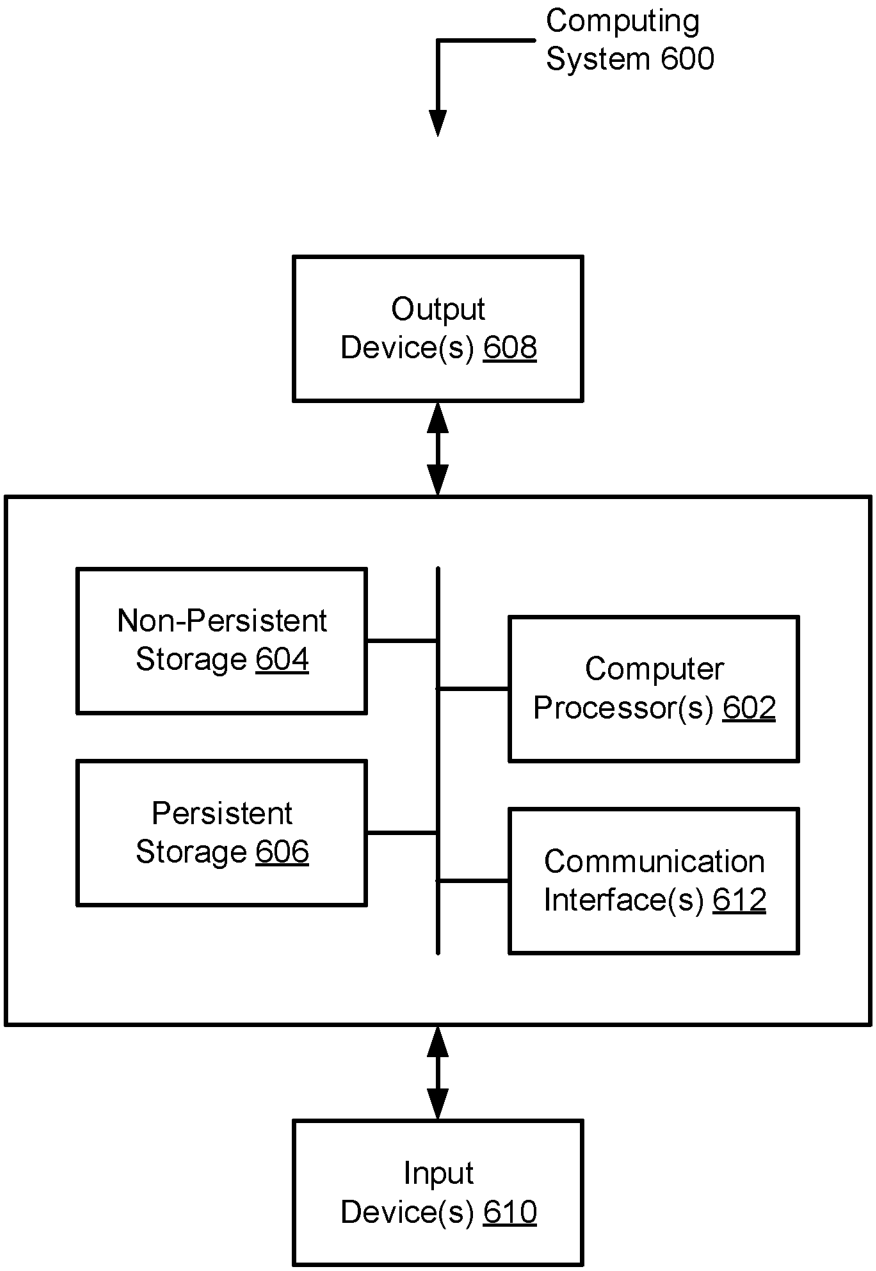
FIG. 6 shows an exemplary computing system in accordance with one or more embodiments described herein.

FIG. 6 shows an exemplary computing system in accordance with one or more embodiments described herein. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for optimal service recovery, the method comprising:

receiving, by a vendor recovery service and from a client infrastructure, a production inventory file reflecting a current configuration of a client production environment, wherein the production inventory file reflects a pre-failure state of the client production environment of the client infrastructure and wherein the receiving occurs prior to the client production environment experiencing a failure;

processing, by the vendor recovery service and using at least one learning model, a corpus of production inventory files comprising the production inventory file to obtain a production recovery file reflecting an optimal service recovery strategy, wherein the processing occurs prior to the client production environment experiencing the failure;

transmitting, by the vendor recovery service, the production recovery file to the client infrastructure;

receiving, by a client recovery service of the client infrastructure, the production recovery file for the client production environment;

making a determination, by the client recovery service, based on a monitoring of the client production environment, and following receiving the production recovery file, that the client production environment is experiencing the failure; and performing, by the client recovery service and based on the determination, an optimized recovery of the client production environment according to the optimal service recovery strategy reflected in the production recovery file.

2. The method of claim 1, wherein the at least one learning model applies Latent Dirichlet Allocation (LDA) on the corpus of production inventory files.

3. The method of claim 1, wherein the corpus of production inventory files further comprises a plurality of other production inventory files received previously from the client infrastructure and at least one other client infrastructure.

4. The method of claim 1, wherein the production recovery file corresponds to the production inventory file.

5. The method of claim 1, wherein the failure experienced by the client production environment is a complete failure impacting all services operating on the client production environment.

6. The method of claim 1, wherein the failure experienced by the client production environment is a partial failure impacting a portion of services operating on the client production environment.

7. The method of claim 1, wherein the optimized recovery of the client production environment employs parallel recovery action threads to implement the optimal service recovery strategy.

8. The method of claim 1, the method further comprising:

prior to processing the corpus of production inventory files:

scanning, by the vendor recovery service, the production inventory file to identify a malicious entity therein; and sanitizing, by the vendor recovery service and based on identifying the malicious entity, the production inventory file to remove the malicious entity.

9. A non-transitory computer readable medium (CRM) comprising computer readable program code, which when executed by a computer processor, enables the computer processor to perform a method for optimal service recovery, the method comprising:

receiving, by a vendor recovery service and from a client infrastructure, a production inventory file reflecting a current configuration of a client production environment, wherein the production inventory file reflects a pre-failure state of the client production environment of the client infrastructure and wherein the receiving occurs prior to the client production environment experiencing a failure;

processing, by the vendor recovery service and using at least one learning model, a corpus of production inventory files comprising the production inventory file to obtain a production recovery file reflecting an optimal service recovery strategy, wherein the processing occurs prior to the client production environment experiencing the failure;

transmitting, by the vendor recovery service, the production recovery file to the client infrastructure;

receiving, by a client recovery service of the client infrastructure, the production recovery file for the client production environment;

making a determination, by the client recovery service, based on a monitoring of the client production environment, and following receiving the production recovery file, that the client production environment is experiencing the failure; and performing, by the client recovery service and based on the determination, an optimized recovery of the client production environment according to the optimal service recovery strategy reflected in the production recovery file.

10. The non-transitory CRM of claim 9, wherein the at least one learning model applies Latent Dirichlet Allocation (LDA) on the corpus of production inventory files.

11. The non-transitory CRM of claim 9, wherein the corpus of production inventory files further comprises a plurality of other production inventory files received previously from the client infrastructure and at least one other client infrastructure.

12. The non-transitory CRM of claim 9, wherein the production recovery file corresponds to the production inventory file.

13. The non-transitory CRM of claim 9, wherein the failure experienced by the client production environment is a complete failure impacting all services operating on the client production environment.

14. The non-transitory CRM of claim 9, wherein the failure experienced by the client production environment is a partial failure impacting a portion of services operating on the client production environment.

15. The non-transitory CRM of claim 9, wherein the optimized recovery of the client production environment employs parallel recovery action threads to implement the optimal service recovery strategy.

16. The non-transitory CRM of claim 9, the method further comprising:

prior to processing the corpus of production inventory files:

scanning, by the vendor recovery service, the production inventory file to identify a malicious entity therein; and sanitizing, by the vendor recovery service and based on identifying the malicious entity, the production inventory file to remove the malicious entity.

17. A system, comprising:

a client infrastructure comprising a client production environment and a client recovery service; and a vendor infrastructure operatively connected to the client infrastructure, and comprising a vendor recovery service, wherein the vendor recovery service comprises a first computer processor configured to at least in part perform a method for optimal service recovery, the method comprising:

receiving, by a vendor recovery service and from a client infrastructure, a production inventory file reflecting a current configuration of a client production environment, wherein the production inventory file reflects a pre-failure state of the client production environment of the client infrastructure and wherein the receiving occurs prior to the client production environment experiencing a failure;

processing, by the vendor recovery service and using at least one learning model, a corpus of production inventory files comprising the production inventory file to obtain a production recovery file reflecting an optimal service recovery strategy, wherein the processing occurs prior to the client production environment experiencing the failure;

transmitting, by the vendor recovery service, the production recovery file to the client infrastructure;

receiving, by the client recovery service of the client infrastructure, the production recovery file for the client production environment;

making a determination, by the client recovery service, based on a monitoring of the client production environment, and following receiving the production recovery file, that the client production environment is experiencing the failure; and performing, by the client recovery service and based on the determination, an optimized recovery of the client production environment according to the optimal service recovery strategy reflected in the production recovery file.

18. The system of claim 17, the client infrastructure further comprising:

a client infrastructure firewall configured to inspect incoming network traffic directed to the client infrastructure, wherein the client recovery service further comprises a client proxy handler configured to implement a reverse proxy to supplement the client infrastructure firewall.

19. The system of claim 17, the vendor infrastructure further comprising:

a vendor infrastructure firewall configured to inspect incoming network traffic directed to the vendor infrastructure, wherein the vendor recovery service further comprises a vendor proxy handler configured to implement a reverse proxy to supplement the vendor infrastructure firewall.

20. The system of claim 17, the client infrastructure further comprising:

a client backup environment configured to serve as a disaster recovery alternative to the client production environment at an onset of the failure experienced by the client production environment.

* * * * *